C. A. BLACKWELDER.
NUT LOCK.
APPLICATION FILED APR. 1, 1916.
1,211,391.
Patented Jan. 9, 1917.
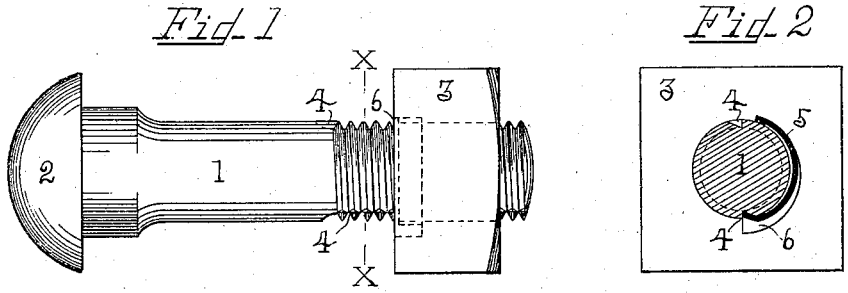
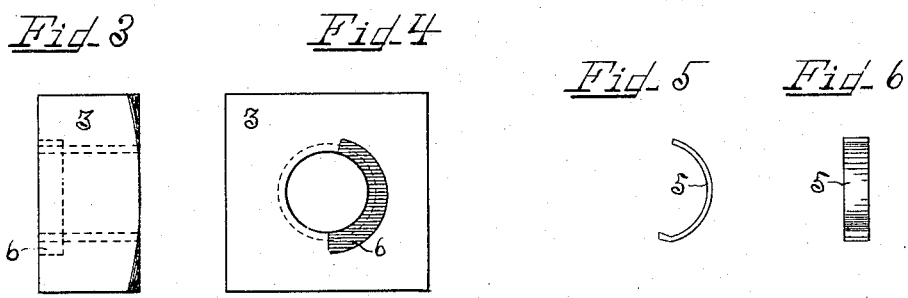
Witnesses.
H. G. Gardiner.
Harry L. Handy.
Inventor.
Charlie A. Blackwelder.
J. P. Dederick.
By
Attorney.

UNITED STATES PATENT OFFICE.

CHARLIE A. BLACKWELDER, OF GUNTER, TEXAS.

NUT-LOCK.

1,211,391.  Specification of Letters Patent.  Patented Jan. 9, 1917.

Application filed April 1, 1916. Serial No. 88,389.

*To all whom it may concern:*

Be it known that I, CHARLIE A. BLACKWELDER, a citizen of the United States, residing at Gunter, in the county of Grayson and State of Texas, have invented certain new and useful Improvements in Nut-Locks, of which the following is a specification.

The object of this invention is to provide a simple and efficient device for locking a nut to the threaded portion of a bolt, and one that can be manufactured at small cost. Devices now in use for accomplishing this purpose are more or less complicated and require machine work in their manufacture, which adds greatly to the cost of production.

My invention is designed to overcome these inherent objections and consists of the construction and novel combination and arrangement of parts hereinafter fully described, illustrated in the accompanying drawings, and pointed out in the claim hereto appended.

In the drawings which serve to illustrate this invention more fully a bolt is shown constructed in accordance with the invention. Numerals of reference thereon designating similar parts in the several views thereof, and in which—

Figure 1 is a side elevation of a bolt with nut attached. Fig. 2 is a sectional view through the line X X of Fig. 1. Fig. 3 is an edge view of the nut only. Fig. 4 is a side view of the same, and Figs. 5 and 6 are detail views of the locking member.

Referring specifically to the drawings, the bolt shown comprises the usual shank 1, having a head 2 at one end and provided at its other end with a screw-threaded portion engaging the nut 3, all of which may be of any suitable form and dimensions. The bolt 1 has preferably two longitudinal grooves 4, oppositely disposed and extending along its threaded part, each groove comprising an upright wall and an inclined wall. A segmental or semicircular spring-dog 5 is loosely housed in a circular chamber 6 formed in the body of the nut, which dog constitutes the locking medium of the nut with the bolt when one end thereof is in engagement with either of the grooves 4 of the bolt, as shown in Fig. 2.

The manner of applying the nut and locking device is as follows: The bolt having been passed through the articles to be fastened together, the chambered face of the nut is started thereon, when a spring dog is placed in the chamber, with one end thereof resting in one of the longitudinal grooves of the bolt. The nut and spring are then rotated simultaneously, which movement will slightly raise the ends of the spring when passing over the inclined portion of the respective grooves as the turning proceeds. The tension of the spring being comparatively slight, the binding engagement of its ends with the threads of the bolt, when the nut is being screwed down, will be practically imperceptible; but when said nut tends to turn in the opposite direction the narrow end wall of said chamber would impinge or press against the end of the spring, causing the other inturned end of said spring to engage the square shoulder of one of the grooves and effectually prevent the nut from unscrewing. When not desired to have the nut locked to the bolt, the spring-dog is dispensed with, when for all practical purposes an ordinary bolt is provided.

It is obvious that the described nut-lock can be used in the construction of railways, bridges, agricultural machines, and, in fact, on any structure in which bolts with nuts are employed, therefore the many advantages of the hereindescribed invention will be apparent without further description, it being understood however that various changes in the size, shape, proportion, and minor details of construction may be resorted to without departing from the spirit or sacrificing any of the advantages of the invention.

Having thus described my invention, what I esteem as new and desire to secure by Letters Patent of the United States of America, is—

The combination with a screw threaded bolt having oppositely disposed grooves extending longitudinally along its threaded part, each groove comprising an upright wall and an inclined wall, of a lock nut having a threaded bore engaging the threaded portion of said bolt and a curved cam shaped chamber in its face side adjacent said bore, and a flat segmental spring dog housed in said chamber, one end of said dog engaging the narrow end wall of the chamber and the other end being inturned and adapted to engage the upright wall of one of said grooves, substantially as set forth.

In testimony whereof I affix my signature in the presence of two witnesses.

CHARLIE A. BLACKWELDER.

Witnesses:
H. G. GARDINER,
HARRY L. HANDY.